United States Patent

Litschert, II et al.

[11] Patent Number: 5,785,808
[45] Date of Patent: Jul. 28, 1998

[54] HEAT EXCHANGER WITH PRESSURE CONTROLLING RESTRICTER

[75] Inventors: John H. Litschert, II; Bruce D. Sterrett, both of Charlotte, N.C.

[73] Assignee: LCI Corporation, Charlotte, N.C.

[21] Appl. No.: 538,014

[22] Filed: Oct. 2, 1995

[51] Int. Cl.$^6$ ........................................ B01D 1/00
[52] U.S. Cl. ........................ 159/47.1; 261/109.1; 261/140
[58] Field of Search ..................... 159/47.1; 165/109.1, 165/140

[56] References Cited

U.S. PATENT DOCUMENTS

| | | |
|---|---|---|
| 4,068,830 | 1/1978 | Gray . |
| 4,522,504 | 6/1985 | Greverath . |
| 4,735,263 | 4/1988 | Andro et al. . |
| 4,881,596 | 11/1989 | Bergmann et al. . |
| 4,932,468 | 6/1990 | Ayub . |
| 5,117,903 | 6/1992 | Oshiyama et al. . |
| 5,307,867 | 5/1994 | Yasuda et al. . |
| 5,312,185 | 5/1994 | Kojima et al. . |
| 5,385,122 | 1/1995 | Stalport et al. . |

*Primary Examiner*—Timothy McMahon
*Attorney, Agent, or Firm*—Kennedy, Covington, Lobdell & Hickman LLP

[57] ABSTRACT

A heat transfer method for a polymer mixture is disclosed, comprising the steps of transporting the polymer mixture in a flow path through a heat exchange medium and restricting the flow of the polymer mixture at a predetermined location along the flow path. This method defines a zone upstream of the flow restriction device, wherein the mixture is sufficiently pressurized to prevent vaporization of volatile components of the mixture. This method also defines a zone downstream of the flow restriction device maintained at a pressure lower than that of the upstream zone, wherein the pressure is sufficiently relieved to induce partial vaporization of volatile components of the mixture.

4 Claims, 1 Drawing Sheet

HEAT EXCHANGER WITH PRESSURE CONTROLLING RESTRICTER

BACKGROUND OF THE INVENTION

The present invention relates generally to a method for exchanging heat between two fluids having different temperatures and, more particularly, to a method of heat exchange in which the flow of one fluid is restricted in order to maintain it in the liquid phase in the heat exchange zone upstream of the restriction.

There are many different types of heat exchangers, for example, concentric tube heat exchangers, fin-and-tube heat exchangers, plate-and-fin heat exchangers, and shell-and-tube heat exchangers. Each type of heat exchanger exhibits different heat exchange characteristics, and the method of heat exchange and the type of heat exchanger to be used are often selected with respect to the particular application. One characteristic shared by most heat exchangers used for liquids is that there is a significant pressure drop in the fluid between the heat exchanger inlet and the heat exchanger outlet. If a fluid to be heated contains a mixture of substances, and if this pressure drop between the heat exchanger inlet and outlet results in a pressure that is lower than the vapor pressure of the mixture, then the mixture will boil in the heat exchanger. This results in two-phase flow through part of the heat exchanger and a reduction in the rate of heat transfer in the heat exchanger. This is particularly troublesome when there is a target temperature to be reached at the outlet of the heat exchanger.

On the other hand, often it is desirable to provide a heat exchange method to vaporize some of the components of the mixture in order to remove them from the fluid. Such would occur when the fluid stream comprises a product with impurities that are desired to be removed. These impurities may be adulterants or they may simply be unreacted reactants that are present to shift the equilibrium of a reaction in favor of more product. Often, it is desirable to recover these reactants and recycle them for future use. If these components have a higher vapor pressure than the vapor pressure of the product, which is often the case in polymer applications, a reduction in pressure will allow these impurities to vaporize, enabling them to be more easily stripped from the mixture. However, if the product is desired to be at a particular temperature at the outlet of the heat exchanger, the presence of vapor will hinder effective heat exchange to the product, which is still in liquid form.

Generally, such vaporization of the impurities is accomplished by exiting the mixture into a flash chamber at a lower pressure than the heat exchanger. This results in vaporization of those components of the mixture with a higher vapor pressure, enabling them to be stripped from the mixture. Such a flash chamber is not normally in a heat exchange medium and the heat of vaporization of the impurities must be provided by the sensible heat obtained by cooling of the liquid product. This results in a lower product temperature at the exit of the flash chamber. If some of the impurities are already vaporized when the mixture enters the flash chamber, less heat will be required to vaporize the remaining impurities and, thus, less cooling of the product liquid would occur. If some of the vaporization occurred in the heat exchanger, some of the heat of vaporization could be provided by the other heat exchange fluid in the heat exchanger. This is particularly beneficial if the exit temperature of the other heat exchange fluid from the heat exchanger is of little concern.

Therefore, it would be advantageous to many heat exchange processes to maximize heat exchange to a product liquid, while also allowing for some volatilization of impurities present in the mixture that have a higher vapor pressure than that of the product. This is particularly true where it is desired to remove impurities with a higher vapor pressure from the mixture and to result in a product that exits the system at a desired temperature. Such an advantageous method would allow for the other heat exchange liquid to provide some of the heat of vaporization necessary to volatilize the impurities and maximize the heat transferred to the liquid product.

One method to ensure that the mixture pressure does not drop below the vapor pressure of the mixture is to restrict the flow of the fluid such that the pressure is maintained. This can be accomplished by inclusion of a flow restriction device at a predetermined location along the flow path of the mixture.

Flow restriction devices are currently known in heat transfer applications, but are used for flow control rather than for pressure control. This is generally accomplished by locating a flow restriction device at or before the inlet to the heat exchanger flow path to direct or redirect the amount of mixture flowing through a particular portion of the heat exchanger.

For example, U.S. Pat. No. 4,735,263 discloses a flow control device for a steam circulating heat exchanger tube that is located near the end of the tube. U.S. Pat. No. 4,932,468 discloses a heat exchanger with a multiplicity of vertical heat transfer tubes with flow restricting devices in the upper end of the tubes to promote efficient liquid distribution to the tubes. U.S. Pat. No. 5,385,122 discloses a removable restricting device to adjust a supply water flow rate in a steam generator tube. U.S. Pat. No. 5,117,903 discloses a multi-tube heat exchanger with flow altering devices located in the inlet head area to ensure that sufficient flow is directed to the center pipes.

SUMMARY OF THE INVENTION

Accordingly, it is an object of the present invention to provide a heat exchange method that restricts the flow at a predetermined location along the flow path to reduce the pressure drop between the heat exchanger inlet and the point at which flow is restricted. This impedes volatilization of the fluid or its components and maximizes heat transfer to the liquid. Another object of the present invention is to provide a zone downstream of the point at which flow is restricted that is at a lower pressure than the zone upstream of the flow restriction, enabling some volatilization to occur in order to provide some heat of vaporization from the other heat exchange fluid.

Briefly summarized, the present invention accomplishes such objectives by providing a method of heating a fluid, comprising the steps of transporting the fluid in a flow path through a heat exchange medium, and restricting the flow of the fluid at a predetermined location along the flow path for defining a zone upstream of the flow restriction device wherein the pressure drop in the fluid is minimized. This method may also include a second heat exchanger zone in the flow path downstream of the predetermined restricting location, wherein the pressure in the fluid is sufficiently relieved to induce partial volatilization of volatilizable components in the fluid, causing the fluid to assume a combined liquid/gaseous phase while continuing to be exposed to the heat exchange medium. This method further comprises the step of continuously mixing the fluid along the flow path both upstream and downstream of the predetermined restricting location. In a preferred embodiment, the fluid is a polymer mixture containing volatilizable impurities, either adulterants or unreacted reactants.

The present invention also provides a heat exchanger apparatus to heat a fluid, comprising a heat exchange medium with an inlet and outlet through which the fluid is transported, and a flow restriction device at a predetermined location in the flow path to minimize the pressure drop in the fluid from the heat exchanger inlet to the flow restriction device. The heat exchanger may also provide for a second zone downstream of the flow restriction device that is at a lower pressure than the zone upstream of the flow restriction device.

In a preferred embodiment, the heat exchanger is a shell-and-tube heat exchanger with a shell side and a tube side, with the product mixture stream flowing in the tube side. The tube side is single pass with essentially straight tubes, the tubes having a means for continuously mixing the fluid. The shell side is divided into a plurality of regions by a divider plate, each region having an inlet and an outlet for the other heat exchange fluid, such that there is at least one shell-side region upstream of the flow restriction device and at least one shell-side region downstream of the flow restriction device.

By providing a first zone in the tubes upstream of the flow restriction device with a relatively low pressure drop, the fluid retains a substantially liquid phase, maximizing the heat transfer in this zone to the fluid by the other heat transfer fluid. Maintaining the second zone downstream of the flow restriction device at a significantly lower pressure than the first zone allows volatile components of the fluid to vaporize in the second zone, once the pressure reduces to that of the vapor pressure of the mixture. In this zone, a significant portion of the heat of vaporization is provided by the other heat exchange fluid, instead of by cooling of the product fluid. This allows for less cooling of the product fluid after it leaves the heat exchanger, if it were to enter a flash chamber and lose heat to the heat of vaporization required to vaporize the remaining volatile components of the fluid mixture.

DESCRIPTION OF THE PREFERRED EMBODIMENT

Figure 1:
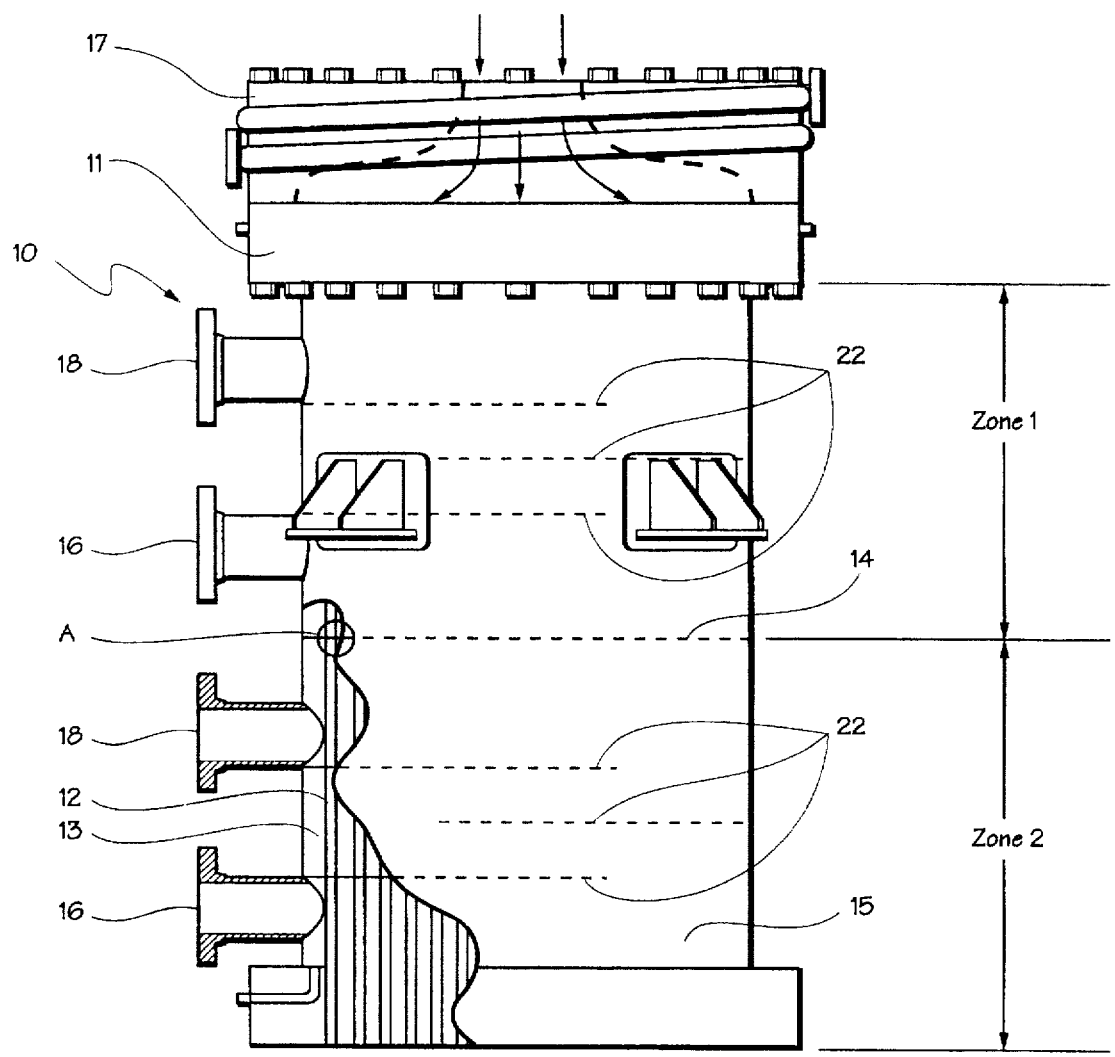
FIG. 1 is an elevational view, with portions broken away, of a single-pass, multi-tube, vertical, shell-and-tube heat exchanger employing the features of the present invention.
Figure 2:
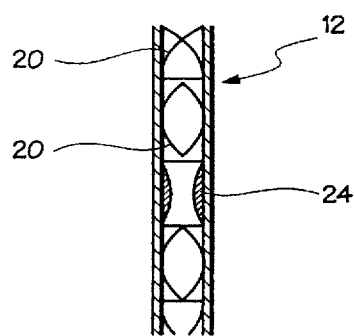
FIG. 2 is an enlarged view of a portion of one tube enclosed by the circle identified by A on FIG. 1.

The accompanying figures illustrate a preferred embodiment of the present invention. A method of heating a fluid is provided in which the fluid is transported through a heat exchanger 10, and the flow of the fluid is restricted at a predetermined location along the flow path. This defines a zone upstream of a device which restricts the flow wherein the pressure drop of the fluid is minimized. In the preferred embodiment, there is also a zone on the downstream side of the device which restricts the flow, such that the pressure in the downstream fluid is lower than the pressure in the fluid upstream of the flow restriction device. This causes vaporization of the volatile components of the mixture when the pressure of the mixture drops below the vapor pressure of the mixture. This method will be described in further detail herein in reference to the heat exchanger 10 that employs the preferred embodiment of the heat transfer method.

The heat exchanger 10 is a vertical, shell-and-tube heat exchanger, having a tube sheet 11 which supports a plurality of fluid-flow tubes 12 extending the length of the heat exchanger 10. The tubes 12 are enclosed within an outer shell 15 defining an open interior chamber 13 for flow therethrough of a heat exchange fluid. A bonnet 17 is mounted above the tube sheet 11 to direct incoming fluid (signified by directional arrows) to be heated into the upper ends of the tubes 12. At approximately the mid-point of the heat exchanger 10, the shell 15 interiorly supports a divider plate 14 that divides the shell side of the heat exchanger 10 into two regions. Each region of the shell side has an inlet 16 opening through the shell 15 into the chamber 13 and an outlet 18 opening outwardly from the chamber 13 through the shell 15. The inlets 16 and the outlets 18 are arranged such that the flow of the fluid in the shell side is counter to the flow of the fluid in the tube side, the counterflow serving to improve heat transfer efficiency (although those skilled in the art will understand that the fluid flow could be reversed). Each of the regions of the shell side is also provided with a plurality of baffles 22 to force the fluid in the shell side to contact the tubes 12 several times before exiting.

The tubes 12 all contain a means 20 for continuously mixing the fluid that flows therein. Preferably, the tubes 12 are BLENDREX® static mixer tubes manufactured by LCI Corporation. At approximately the mid-point of each of the tubes 12, in an area A as shown in FIG. 1, there is a flow restriction device 24. This flow restriction device 24 is any device designed to restrict flow through a tube or a pipe or the like, such as a reduced diameter orifice, venturi, nozzle, etc. The flow restriction device 24 effectively divides the tubes 12 into two zones designated as zone 1 and zone 2 in FIG. 1. In the preferred embodiment, the flow restriction device 24 is located in the tubes 12 at approximately the same location that divider plate 14 is located in the shell side of the heat exchanger 10 around tubes 12. In the preferred embodiment, the fluid which flows through the tube side is a mixture of polystyrene and the reactants that create the polystyrene—ethylbenzene and styrene. The ethylbenzene and styrene have much higher vapor pressures than does the polystyrene. If the pressure in the tube side of the heat exchanger 10 falls below that of the vapor pressure of the mixture, these components will volatilize within the tubes 12. This results in two-phase flow through the tubes 12. Heat exchange to a vapor, or to two-phase flow that includes a vapor, is less efficient than heat transfer to a single-phase liquid fluid. Additionally, when a fluid is vaporized, some of the heat transfer goes to provide the heat of vaporization instead of increasing the temperature of the fluid mixture, and the liquid stream also cools to provide some of the heat of vaporization.

The flow restriction device 24 minimizes the pressure drop in zone 1 between the inlet to the tubes 12 and the flow restriction device 24. This ensures that the pressure in zone 1 remains above the vapor pressure of the mixture. As the fluid passes through the flow restriction device 24, it undergoes a significant pressure drop from the pressure maintained in zone 1. When this occurs, vapor bubbles begin to form in the liquid. At this point, the physical state of the fluid is primarily liquid phase containing bubbles and it continues to receive transferred heat from the hot metal surfaces of the BLENDREX® tubes 12. As the pressure continues to drop as the fluid flows along the tubes 12 in zone 2, the bubbles grow rapidly in size because of the thermal expansion of the gas formed and because of the continued vaporization of the volatile components. The heat required for this continued vaporization is derived by both cooling of the liquid solution and from the contact with the surfaces of the tubes 12 that are heated by the fluid in the shell side.

Eventually, the growing bubbles result in a major disruption of the continuous liquid phase, which breaks into various sized liquid droplets surrounded by vapor. This can be visualized by imagining pushing the button on a can of shaving cream containing compressed air that is nearly out of shaving cream and that then sputters as the escaping air entrains the shaving cream. At this point, heat transfer between the surface of the tubes 12 and the liquid decreases substantially because the heat transfer surfaces are mainly in contact with vapor. The physical state of the stream at this stage is a vapor in turbulent motion caused by the vaporization process and the mixing elements 20 in the tubes 12 that is carrying substantial amounts of entrained liquid. As the stream passes through the tubes 12, the entrained particles of liquid impinge upon the hot surfaces of the tubes 12, resulting in rapid heat transfer over the limited area of the liquid droplet that contacts the tubes 12. That portion of the liquid droplet in contact with the hot metal surface quickly vaporizes, thus insulating the drop from heat penetration and the drop reenters the turbulent vapor stream. This process is continuously repeated along the length of the tubes 12 in zone 2.

In the preferred embodiment, the fluid exiting zone 2 and exiting the heat exchanger 10 enters a flash chamber (or so-called devolatilizer) (not shown), which is at a lower pressure than the pressure in zone 2. This will result in the vaporization of all remaining volatile elements in the fluid mixture. The heat of vaporization in the flash chamber is provided entirely by the cooling of the liquid product. Thus, it can be seen that the volatilization that occurs in zone 2 of the heat exchanger 10 reduces the amount of heat lost from the product liquid stream to vaporize the remaining volatile components after the mixture exits from the heat exchanger 10. The product exiting the flash chamber is then transported to a downstream processing station, e.g., being pumped by a gear pump to a screw extender.

While the components of the fluid mixture in the preferred embodiment are polystyrene and the reactants that combine to create polystyrene—styrene and ethylbenzene—it will be recognized by one skilled in the art that this method is appropriate for any fluid mixture wherein the components have different vapor pressures. Generally, there will be a desired product and accompanying impurities, such as adulterants and unreacted reactants. Often, it is desirable to recover the impurities for recycling or for uses in other processes. Forcing the volatilization of volatile impurities in the liquid stream enables them to be removed from the mixture easily.

By varying the location of the flow restriction device 24, the amount of volatilization that will occur in the heat exchanger 10 may be controlled as desired. At one extreme, if the flow restriction device 24 is located at or near the inlet to zone 1, the heat exchanger 10 will function much like conventional heat exchangers and there will be a very short zone 1 that is maintained at relatively constant pressure. By contrast, locating the flow restriction device 24 at or near the exit of zone 2 is an improvement over the current state of the art because then the pressure drop in the tubes 12 of heat exchanger 10 is minimized. This results in a very long zone 1 and minimal volatilization of volatile impurities in the fluid mixture flowing through the tubes 12. This will maximize the heat transfer to the fluid flowing through the tubes 12 and will be particularly useful if the return temperature of the shell-side heat exchanger fluid at the outlets 18 is of concern. Because this restricts the volatilization in most or all of the tube-side fluid, the heat transfer from the shell-side fluid is maximized.

In the preferred embodiment, using polystyrene and its unreacted reactants styrene and ethylbenzene, it is determined that the optimum location of the flow restriction device 24 is at approximately the midpoint of the length of the tubes 12. Modification of this location results in the modified pressure characteristics previously discussed, and a different fluid mixture might have an optimum restriction location one-third of the distance from the inlet, or 80 percent of the distance from the inlet, or at some other location.

It would also be apparent to one who is skilled in the art to modify the type of heat exchanger that is used for this method. For example, this method could also be utilized with a U-tube heat exchanger, with a heat exchanger with several tube passes or with several shell passes. Other specific modifications of the heat exchange medium could also be made without departing from the spirit of the invention.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. A method of heating a polymer mixture containing volatilization components, comprising the steps of:

transporting the polymer mixture in a flow path through a heat exchange medium; and restricting the flow of the polymer mixture at a predetermined location along the flow path for defining a first heat exchanger zone in the flow path upstream of the predetermined restricting location, wherein the polymer mixture is sufficiently pressurized to maintain a substantially liquid phase and to prevent volatilization of the components in the polymer mixture, and a second heat exchanger zone in the flow path downstream of the predetermined restricting location, wherein the pressure in the polymer mixture is sufficiently relieved to induce partial volatilization of the volatile components in the polymer mixture, causing the polymer to assume a combined liquid/gaseous phase while continuing to be exposed to the heat exchange medium.

2. The method of claim 1, further comprising the step of continuously mixing the polymer mixture along the flow path, both upstream and downstream of the predetermined restricting location.

3. The method of claim 1, further comprising the step of restricting the flow of the polymer mixture at substantially the mid-point of the flow path through the heat exchange medium.

4. The method of claim 1, further comprising the step of exiting the combined liquid/gaseous mixture to a lower pressure chamber to further volatilize the volatile components.

* * * * *